United States Patent

[11] 3,590,535

[72] Inventors Donald H. Benson
 Spenceport;
 Willard R. Pratt, Brighton, both of, N.Y.
[21] Appl. No. 818,949
[22] Filed Apr. 24, 1969
[45] Patented July 6, 1971
[73] Assignee Federal-Mogul Corporation
 Southfield, Mich.

[54] DIAMOND ABRASIVE SAW BLADE
 11 Claims, 6 Drawing Figs.
[52] U.S. Cl. .................................................. 51/206.4,
 51/293, 51/309
[51] Int. Cl. ...................................................... B24d 5/06
[50] Field of Search ............................................. 51/206,
 206.4, 293, 309

[56] References Cited
 UNITED STATES PATENTS
2,349,825 5/1944 Kelleher ...................... 51/309
2,818,850 1/1958 Schwarzkopf et al .......... 51/206 X
3,064,399 11/1962 Anderson ..................... 51/206.4
3,298,806 1/1967 Cicchelli ...................... 51/293

Primary Examiner—Granville Y. Custer, Jr.
Attorneys—Charles Shepard and Stonebraker and Shepard ABSTRACT: A diamond abrasive saw blade or cutoff disc in which diamond-impregnated segments are arranged at intervals on the circumference of a wrought metal core or drive disc. Each diamond-bearing segment is initially formed on a base or underlay of wrought metal such as steel, which can be accurately machined to fit accurately on the periphery of the drive disc. The close mating of the machined underlay with the machined periphery of the drive disc enables the underlay to be attached to the drive disc by electron beam welding, which produces such a narrow band of heat that it is not necessary to provide the drive disc with the conventional radial slots which have been required in the past when other types of welding had to be used. The radially outward face of the metal underlay may be notched or scalloped or otherwise nonconcentric with respect to the center of rotation of the drive disc, so that when part of the underlay wears away, the resulting exposed portion of the diamond-bearing segment will be nonconcentric to the axis of rotation and thus will tend to dissipate the swarf and minimize further wear on the region where the abrasive segment is joined to the drive disc.

PATENTED JUL 6 1971　　3,590,535

DIAMOND ABRASIVE SAW BLADE

BACKGROUND OF THE INVENTION

Saw blades or cutoff discs having abrasive segments impregnated with diamonds and arranged circumferentially on a steel drive disc are well known in the art. Examples are the cutoff discs or abrasive saws disclosed in U.S. Pat. No. 3,069,816, granted Dec. 25, 1962 for an invention of the present joint applicants, and U.S. Pat. No. 3,203,774, granted Aug. 31, 1965 for an invention of one of the present joint applicants.

It is customary to manufacture the abrasive segments separately, and then affix the completed segments to the periphery of a steel core or drive disc, by welding or brazing or soldering. Uniting the segments to the edge of the disc requires so much heat that it has been necessary to use radial slots in the drive disc, as indicated by the numeral 17 in both of the above-mentioned patents, in order that heat applied locally for attaching one segment or group of segments to the edge of the core or drive disc will not spread too far in a circumferential direction and will not cause warping or other damage to other peripheral portions of the drive disc.

Moreover, it has been difficult to secure a sufficiently strong and tenacious bond between the abrasive segments and the drive disc. As explained in said prior patents, the abrasive segments are customarily formed by mixing a powdered matrix material with diamond powder or particles, and pressing the powder mixture in a graphite mold, using either a hot pressing technique to heat the powder while it is under pressure in the mold, or a cold pressing technique to compact the powder so it may be readily handled, and then give it the necessary heat treatment after the pressure is removed. In either case, whether hot pressing or cold pressing is employed, small particles of graphite are likely to flake off of the graphite mold, and become pressed into the surfaces of the powder. If graphite particles become embedded in the concave surface of the segment which is to be affixed to the convex circumferential surface of the drive disc, these particles of graphite will weaken the bond between the abrasive segment and the drive disc. Even if particles do not flake from the graphite mold, it is still quite a difficult problem to form the concave face of the segment to the exact shape necessary for a good close fit on the convex surface of the drive disc. In the prior constructions, subsequent machining of the concave surface of the segment, to make it fit the drive disc accurately, is not possible if this portion of the abrasive segment contains any diamond powder, and in any event is not practical, even if no diamond powder is present in this particular surface of the abrasive segment.

An object of the present invention is the provision of a generally improved and more satisfactory diamond abrasive saw blade or cutoff disc, which overcomes the difficulties and undesirable features above mentioned.

Another object of the invention is the provision of a saw blade or cutoff disc having an improved bond between the abrasive segments and the core or drive disc on which they are mounted.

Still another object is the provision of an implement of this kind so designed and constructed as to minimize the undercutting action of the swarf produced by a cutting operation, when cutting through concrete and other materials which create a bad swarf action.

BRIEF DESCRIPTION OF THE DRAWING

In the accompanying drawings, incorporated herein by reference and constituting a material part of the disclosure and relating to an exemplary embodiment of the invention.

DESCRIPTION OF THE PREFERRED EMBODIMENTS

Figure 1:
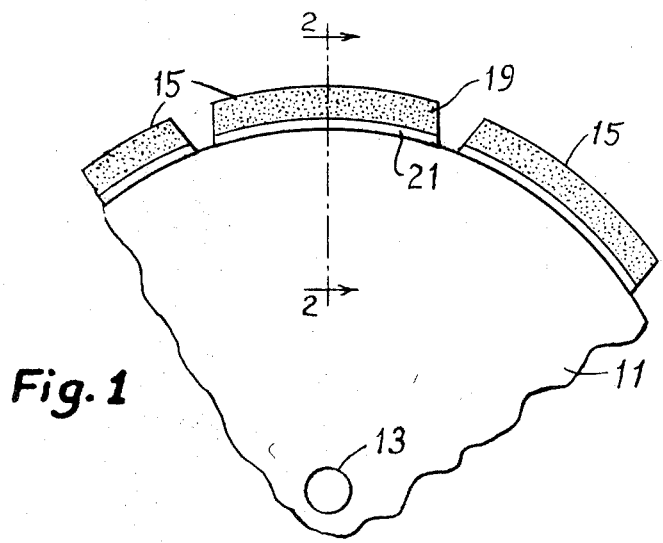
FIG. 1 is a fragmentary face view of a cutoff disc or abrasive saw, utilizing abrasive segments according to the present invention.
Figure 2:
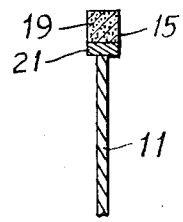
FIG. 2 is a fragmentary radial cross section taken approximately on the line 2-2 of FIG. 1.

Referring first to FIG. 1, showing a fragment of a completed cutoff disc or saw blade according to the present invention, this comprises a central sheet metal drive disc or core 11 made of suitable wrought metal, preferably steel, and provided with a central aperture or arbor hole 13 for mounting the disc on a rotating shaft. Secured around the periphery of the core 11 are a plurality of circumferentially spaced arcuate elements or segments 15, which may be referred to as abrasive segments or cutting segments. These segments 15 are rectangular in cross section, as seen in FIG. 2, and are arcuate in side view or lateral face view, as seen in FIG. 1. Each segment, according to the present invention, comprises an outer portion 19 which provides the cutting or abrading action, and a base portion or underlay portion 21 of wrought metal, such as steel. The thickness of each segment, in the direction of the axis of rotation, is somewhat greater than the thickness of the drive core 11, as seen in FIG. 2, and overhangs at both faces of the drive core, as illustrated. Dimensions may be varied, of course, Typically, each segment 15 may have a thickness (in the direction of axis of rotation) of one-sixteenth to three-sixteenths of an inch, the thickness of the steel core 11 being somewhat less.

The effective abrading or cutting portion of each segment (that is, the radially outward portion indicated at 19) is of any of the conventional materials commonly used in such segments, being composed for example of an abrading material such as diamond dust or fragments embedded in a hard material such as tungsten carbide bonded together with cobalt, or embedded in any other suitable metallic matrix. The present invention is not concerned with the details of this abrading or cutting portion 19 of the segment, but is concerned rather with the manner in which this abrasive portion of the segment is mounted on the base or underlay 21, and the manner in which it is attached to the wrought metal drive disc 11. Thus the composition of the portion 19 may be varied widely without departing from the invention. It may be of uniform consistency throughout, as for example in the abrasive segment disclosed in the above-mentioned U.S. Pat. No. 3,069,816; or it may have different portions or layers with different consistencies (that is, different proportions of diamond dust in the matrix material) as in the above-mentioned U.S. Pat. No. 3,203,774.

According to the present invention, the abrasive portion 19 of each segment is initially formed on a base or underlay 21 of wrought metal which extends through the entire arcuate length or circumferential length of each segment, so that when the segments are assembled on the periphery of the disc 11, the diamond-bearing abrading portion 19 of each segment is separated completely from the disc 11 by the interposed wrought metal underlay 21.

The use of a wrought metal backing at the radially inner surface of each abrasive segment, extending the full length (circumferentially) of the abrasive segment, is an important feature. Such a backing provides a wrought metal surface which can be accurately machined by conventional machining methods, so as to fit perfectly against an accurately machined peripheral surface of the drive disc 11. Then when the completed and machined segment 15 is held in place against the periphery of the drive disc 11, with the machined inner face of the wrought metal backing 21 against the machined outer edge of the disc 11, it is possible to affix the abrasive segment to the disc 11 by what is called electron beam welding. Such welding is known per se, in other fields. As a practical matter, it is not possible to use electron beam welding to join parts together unless these parts are fitted tightly against each other, and are of compatible materials. In the past, it has not been possible to machine the radially inner face or concave face of the abrasive segment, and therefore the inner face of the segment would not fit sufficiently accurately and perfectly against the outer face of the drive disc to permit the use of electron beam welding. But with the present invention, electron beam welding can be used and is highly desirable, because such a weld produces a very narrow zone of heating. Hence there is no great amount of heat to be dissipated, and the heat required for affixing one abrasive segment or one related group of abrasive segments to the drive disc does not adversely affect other parts of the disc so as to cause warping or other damage thereto. Consequently, when using electron beam welding according to the present invention, it is no longer necessary to use the radial grooves or slots in the drive disc, such as shown at 17 in the patents above mentioned, which shots have been necessary in order to prevent too great transfer of heat from one portion of the drive disc to another portion, when using conventional attachment techniques such as brazing or soldering.

While the use of electron beam welding is a preferred and advantageous feature of the present invention, for the above-mentioned reasons, it is not essential to certain other aspects of the invention. Conventional brazing or soldering procedures may be used for affixing the abrasive segments to the circumferential edge of the drive disc 11. If conventional brazing or soldering is used, then radial slots such as shown at 17 in said prior patents may also be used. The use of the wrought metal underlay 21 according to the present invention still has the important advantage over the prior art (even if brazing or soldering is used and electron beam welding is not used) that the concave inner surface of the abrasive segment can be machined to fit more accurately against a machined outer edge of the drive disc than is possible with the prior art, and also the advantage that there are no flakes of carbon or graphite on the inner face of the underlay 21, which would weaken the bond between the abrasive segment and the edge of the drive disc 11. It is true, of course, that when the parts are being pressed in the graphite mold, a flake of graphite might possibly flake off of the mold and stick on the underlay 21 when the underlay is removed from the mold, but since this underlay is made of wrought metal, it is easy to scrape any flake of graphite off of it, and when the underlay is machined, any flake of graphite would be machined off of the metal 21. But if there is no wrought metal underlay like this, any flake of graphite accidentally pressed into the surface of the powdered mixture during the pressing operation could not be removed as a practical matter. Moreover, quite aside from possible presence of graphite flakes, a surface of compressed powdered material containing diamond dust cannot be machined as a practical matter. Even if it is attempted to have a layer of diamond-free compacted powder material beneath the diamond-bearing portion of the segment (as shown for example at 25 in said U.S. Pat. No. 3,203,774) nevertheless there is always the danger that a few stray particles of diamond dust may accidentally become embedded in this portion of the material which is supposed to be free of diamond dust. And even if there is no diamond dust in this portion, nevertheless the fact that this portion is formed from compacted powder material makes accurate machining thereof difficult and at least impractical if not impossible.

In many cases, the backing or underlay 21 of wrought metal may be of uniform thickness (in a radial direction) throughout its length, as illustrated in FIG. 1. However, a nonuniform thickness is sometimes desirable. When the saw blade is used for cutting certain types of material, such as green concrete, the cutaway particles of material form what is called a "swarf" which has a tendency to stay in the cut being made, and frequently causes undercutting or rapid wearing of the blade approximately at the junction between the abrasive segment and the drive disc 11 to which the abrasive segment is fastened. This undercutting can be somewhat reduced and the life of the blade made longer, if the parts are so designed as to break up the swarf to some extent.

This can be accomplished by making the underlay or backing member 21 of nonuniform thickness. If and when undercutting occurs to the extent of wearing away the projecting lateral edges of the metal backing plate 21 (that is, the edges which project beyond the side faces of the disc 11) this will expose the lower edges of the abrasive material 19, and since this abrasive material 19 is harder and more resistant to wear than the wrought metal underlay 21, irregularities or nonconcentric portions of the overhanging edges of the abrasive material 19 will remain in place for a considerable time and will aid in breaking up the swarf, to reduce subsequent undercutting.

If the backing member 21 is of uniform thickness throughout its length, then when the overhanging edges of the backing member are worn away by the swarf, the remaining overhanging edges of the abrasive material 19 will be concentric with the center of rotation of the blade. But by making the member 21 of nonuniform thickness, then it is seen that when the edges of this member are worn away, the remaining overhanging edges of the abrasive material 19 will be nonconcentric to the axis of rotation, and this nonconcentric shape of the overhanging edges will aid greatly in producing swirls or eddies in the swarf and thereby reduce the tendency of the swarf to produce further undercutting of the blade.

Figure 3:
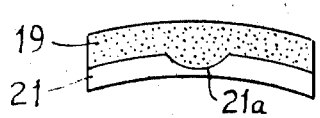
FIG. 3 is a side elevational view of an abrasive segment alone, on a larger scale than shown in FIG. 1, illustrating a modification of the invention.

FIG. 3 shows one form of construction for accomplishing this. Here, the radially outward face of the wrought metallic backing plate or underlay 21 is provided with one or more hollowed out portions or recesses of curved shape, extending across from one lateral edge to the opposite lateral edge of the member 21. One such groove is shown at 21a. When this backing plate 21 is assembled with the powdered matrix material and diamond dust in the press, and the parts are pressed together in an approximately radial direction, the powdered material will enter the groove 21a, and of course will remain therein during the subsequent heat treatment in the manufacture of the abrasive segment. Then after the segment is fastened on the edge of the drive disc 11, if the swarf formed during a cutting operation cuts the lateral edges on the backing member 21 away, there will be a bump or protuberance remaining on the overhanging edge of the abrasive material 19, which will not wear away as fast, and will help to break up or dissipate the swarf and reduce the undesirable cutting action thereof.

Figure 4:
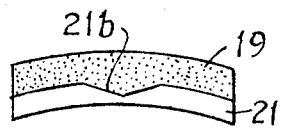
FIG. 4 is a view similar to FIG. 3 illustrating another modification.

It is not necessary that the notch or notches be of curved outline. They may also be angular, as shown at 21b in FIG. 4. The construction is otherwise the same as described in connection with FIG. 3, and serves the same purpose.

Figure 5:
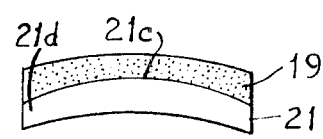
FIG. 5 is a view similar to FIG. 3 illustrating still another modification.

Still another possible construction is shown in FIG. 5. Instead of having a crosswise groove or notch intermediate the length of the backing member 21, the backing member is here made thicker near its middle as shown at 21c and thinner at its ends as shown at 21d. The radially inner face of the backing member 21 (that is, the face which will be welded or soldered to the periphery of the drive disc 11) is curved to the proper radius to fit the periphery of the drive disc, but the other face or radially outer face of the member 21 is here formed as an arc of a circle having a substantially smaller radius. When the overhanging edges of the member 21 wear away, the remaining hard abrasive material 19 will then have overhanging shoulders which are nonconcentric to the axis of rotation of the blade, helping to break up the swarf as above mentioned. Other shapes nonconcentric to the axis of rotation are also possible, the only requirement being that the shape should be one which is easy and inexpensive to manufacture, as by machining, stamping, or otherwise. In each case, however, it will be noted that the underlay or backing member 21, whether having its upper or radially outward surface concentric to the axis of rotation or whether such surface be irregular or otherwise nonconcentric, is in any case of the same length as the abrasive portion 19 of the segment, so that throughout the entire length of the segment the abrasive material 19 is spaced from the periphery of the drive blade 11 by the intervening wrought metallic member 21, the entire length of which can thus be easily machined for accurate close fit to the drive disc.

Figure 6:
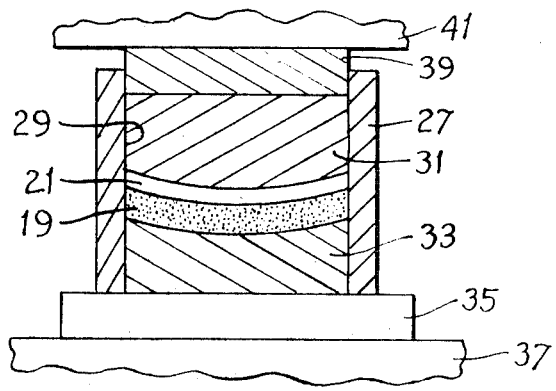
FIG. 6 is a cross-sectional view, partly in diagrammatic form, illustrating a suitable graphite mold for use in forming an abrasive segment according to the invention.

FIG. 6 illustrates somewhat schematically a mold such as may be used in producing the abrasive segments of the present invention. The mold or die comprises a die structure formed of one or more generally rectangular die blocks 27 of graphite defining a longitudinal die channel 29 in which are positioned two plug inserts 31 and 33, likewise of graphite. The lower die plug insert 33 is positioned in the lower portion of the channel 29 and is backed up by a backing block 35 which may also be of graphite and is held positioned against a metallic press member 37 by which the required pressure is applied. The upper graphite plug insert 31 is movably positioned in the upper portion of the die channel 29 for movement under pressure applied by a movable pressure plug 39 to which pressure is applied by the upper cooperating press member 41. The lower graphite plug insert 33 is provided with an upper arcuate die cavity surface 43 which corresponds to the outer curved arcuate surface (radially outermost surface) of the abrasive segment 15. The lower surface of the upper die plug insert 31 is similarly provided with a curved downwardly facing convex die surface 45 corresponding in shape to the curvature desired in the radially inner face of the backing member 21 of the completed abrasive segment, that is, the desired radius of the outer peripheral or circumferential surface of the drive disc 11.

As well understood in the art of manufacturing abrasive segments, the material may be either hot pressed or cold pressed. Both types of pressing are mentioned in the above-mentioned U.S. Pat. No. 3,203,774, and either may be used in making the abrasive segment of the present invention. In FIG. 6 of the present drawings, the members 37 and 41 are intended to represent parts of a conventional hot press, and are designed to apply pressure to the opposite plug inserts 31 and 33 of the graphite die, and also to provide means for heating the die and the material therein while pressure is maintained, such as by conducting electric heating currents through the graphite die plugs 31 and 33.

Merely for the sake of giving a typical specific example, and without intending to limit the invention to this specific example, the following dimensions and other factors may be used. The diamond bearing portion 19 of each abrasive segment may have a width (in the direction of the axis of rotation of the finished blade) of one-eighth inch, a length (circumferentially of the finished blade) of 2 inches, and a depth (radially of the finished blade) of three-sixteenths of an inch. It may be formed of a mixture of metal powder and diamond dust, the diamond dust representing 5 percent by weight of the total powder, and 95 percent of the powder being a mixture of copper powder and tin powder, in the proportions of 9 to 1 by weight. The wrought metal backing member 21 may be of steel, having the same width and length as the diamond bearing section 19, and having a depth (in a radial direction with respect to the finished cutting blade) of one-eighth inch. The radius of the radially inner or concave face of the metal part 21 may be 7 inches (to fit the circumference of a drive disc 11 having the same radius of 7 inches) and the outer face of the diamond bearing section 19 will be concentric therewith. The mixture of copper powder, tin powder, and diamond dust is first placed in the mold or die, then the wrought metal underlay 21 is placed on top of the powder, and pressure and heat are applied. It is pressed under pressure of 2 tons per square inch, heated to 1,300° Fahrenheit, and held at this pressure and temperature for 4 minutes. Then the heat is turned off and the pressure is released and the segment is allowed to cool to room temperature, after which the innermost of concave face is machined accurately to the exact radius of the outer edge of the core 11 which also has been machined, and then the segment is applied to the core and welded thereto by electron beam welding.

It has already been indicated that an important feature of the invention is the use of the wrought metal backing 21, and it will be apparent to those skilled in the art that so long as this feature is used, the dimensions above given as an example are not critical and may be widely varied. Merely as typical ranges of variation, and without even these ranges being intended as a limitation, it may be mentioned that the width of the abrasive segment (in a direction axially of the finished blade) may vary from one-sixteenth inch to one-fourth of an inch; the length may vary from 1 inch to 3 inches; the depth in a radial direction may vary from one-sixteenth inch to one-fourth of an inch; and the radius of the outer edge of the drive disc may vary from 2 inches to 60 inches, the inner face of the abrasive segment being made to fit the outer edge of the drive disc. The underlayer 21 is preferably of the same material as the drive disc 11, both being conveniently of steel of the same kind. However, a nickel-steel alloy or any other suitable wrought metal, capable of being easily machined, may be used. The temperature and pressure used in the hot pressing operation may be varied within the skill of the art, and known conventional cold pressing techniques, followed by heat treatment, may be used if preferred.

It is pointed out that the wrought steel underlayer or backing member 21 of the present invention is not the equivalent of the backing 21 shown in the above-mentioned U.S. Pat. No. 3,069,816 of the present joint applicants. First, the backing 21 in the patent is of cobalt, thus being of a different material than the core or drive disc 11, and therefore not so easily secured to the drive disc by electron beam welding. Second, and more importantly, the underlay portion 21 in said patent is formed from powdered metal (powdered cobalt) rather than from wrought metal, and for this reason also is not readily machined as a practical matter, and not suited readily to electron beam welding. Third, and even more importantly, the underlayer 21 in said patent does not extend through the full length of the abrasive segment, and portions of the abrasive mixture come down flush with the inner face of the underlay 21, so that even if this underlay were of wrought metal (which it is not) this underface still could not be machined as a practical matter, to fit accurately the periphery of the drive disc.

The above specific example mentions that the abrasive portion of the segment may be of copper powder and tin powder with the required proportion of diamond dust therein. However, the composition of the abrasive portion, like the dimensions thereof, is subject to side variation without departing from the invention. The proportion of diamond dust may vary from about 2 percent to about 7 percent (by weight) of the entire mixture. Also, instead of making the mixture mainly of copper powder with some tin powder, the mixture may be of other material known in the art as a matrix material for containing diamond powder or particles. For example, the matrix may be of tungsten carbide powder alone, or of tungsten carbide powder mixed with carbide powder, certain possible proportions for such a mixture being mentioned in column 3 of said U.S. Pat. No. 3,069,816.

Another feature of the present invention is that the steel core or drive disc 11 can be a hardened and tempered core, and preferably is such a core, if the abrasive segments are affixed to the core by electron beam welding.

In the past, it has not been possible to use a hardened and tempered steel core, unless radial slots were used to confine the heat imparted to the core during the brazing or soldering of the abrasive segments to the core. Any attempt to affix the abrasive segments to the core without having radial slots, would usually result in warping the core. Radial slots could be omitted if the entire core and the segments were placed in a furnace or oven and heated to braze all of the segments onto the periphery of the core simultaneously, rather than by local heating, but if this were done, the heating of the entire core in the oven or furnace would draw the temper, so the core in the finished product would not be a hardened and tempered core.

Now, however, with the present invention, these difficulties are overcome. A hardened and tempered steel core 11 can be used. When the underlay 21 is machined to fit sufficiently closely against the periphery of the core so that electron beam welding can be used, the electron beam welding heats the core in such a limited area that it does not draw the temper. If the core 11 is hardened and tempered (by conventional hardening and tempering processes well known in the art) before the abrasive segments are affixed, then it will still be a hardened and tempered core after the abrasive segments are affixed by electron beam welding.

What we claim is:

1. A cutting disc of the type including a wrought metal core adapted to be rotated about an axis of rotation and a plurality of abrasive segments secured to the peripheral circumferential edge of said core, characterized by the novel feature that each abrasive segment includes a body of abrasive material and an underlay of wrought metal covering substantially the whole of the bottom area of said abrasive material to separate said abrasive material substantially completely from said wrought metal core, said wrought metal core and said wrought metal underlay being of metals compatible with each other and being machinable to fit closely and accurately against each other.

2. A construction as defined in claim 1, wherein said wrought metal underlay is at least mainly of steel and said body of abrasive material is at least mainly of a mixture of diamond dust and a binding matrix firmly united to said underlay.

3. A construction as defined in claim 1, wherein said wrought metal underlay is of uniform thickness throughout its area.

4. A construction as defined in claim 1, wherein said wrought metal underlay is of materially different thickness in different parts of its area.

5. A construction as defined in claim 1, wherein the radially inner surface of said wrought metal underlay is a smooth surface concentric with said axis of rotation and the radially outer surface of said underlay, engaging said body of abrasive material, is at least partially nonconcentric with said axis.

6. A construction as defined in claim 5, wherein the thickness of said abrasive segment in the direction of said axis of rotation is greater than the thickness of said core in the same direction, and the lateral edges of said wrought metal underlay project beyond opposite lateral surfaces of said core on both sides.

7. A construction as defined in claim 1, wherein said wrought metal core is of hardened and tempered steel and is continuous in a circumferential direction, without slots extending inwardly from its outer edge, and wherein said abrasive segments are secured to said core by electron beam welding.

8. The method of making a cutting disc of the type including a wrought metal core adapted to be rotated about an axis of rotation and a plurality of abrasive segments secured to the peripheral circumferential edge of said core, which comprises the steps of providing a wrought metal core, providing an abrasive segment including a body of abrasive material and a wrought metal underlay covering the whole area of one side of said body of abrasive material and bonded thereto, machining the exposed surface of said underlay remote from said body of abrasive material to shape it to fit accurately and closely against a portion of the peripheral circumferential edge of said core, placing said machined surface of said underlay against said edge of said core, and bonding said machined surface of said underlay to said edge of said core.

9. The method as defined in claim 8, wherein the step of bonding said machined surface of said underlay to said edge of said core is performed by electron beam welding.

10. The method as defined in claim 8, wherein the step of bonding said machined surface of said underlay to said edge of said core is performed by brazing.

11. The method as defined in claim 8, wherein said wrought metal core is a hardened and tempered steel core, and wherein the step of bonding said machined surface of said underlay to said edge of said core is performed by electron beam welding.